US012642633B2

(12) United States Patent
Albright et al.

(10) Patent No.: US 12,642,633 B2
(45) Date of Patent: Jun. 2, 2026

(54) ORAL IRRIGATOR

(71) Applicant: KONINKLIJKE PHILIPS N.V., Eindhoven (NL)

(72) Inventors: Ethan Albright, Mill Creek, WA (US); Maarten Johannes Bernardus Brugmans, Kirkland, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 701 days.

(21) Appl. No.: 17/775,633

(22) PCT Filed: Nov. 13, 2020

(86) PCT No.: PCT/EP2020/081984
§ 371 (c)(1),
(2) Date: May 10, 2022

(87) PCT Pub. No.: WO2021/099212
PCT Pub. Date: May 27, 2021

(65) Prior Publication Data
US 2022/0401196 A1      Dec. 22, 2022

Related U.S. Application Data

(60) Provisional application No. 62/938,636, filed on Nov. 21, 2019.

(30) Foreign Application Priority Data

Jan. 30, 2020    (EP) ..................................... 20154459

(51) Int. Cl.
*A61C 17/028*          (2006.01)

(52) U.S. Cl.
CPC .................................. *A61C 17/028* (2013.01)

(58) Field of Classification Search
CPC . A61C 17/028; A61C 17/002; A61C 17/0202; A61C 17/024
See application file for complete search history.

(56) References Cited

U.S. PATENT DOCUMENTS

| | | | |
|---|---|---|---|
| 3,863,628 A * | 2/1975 | Vit ........................... | A61K 8/44 |
| | | | 433/88 |
| 10,292,797 B2 | 5/2019 | Chang et al. | |
| 2004/0072122 A1* | 4/2004 | Hegemann ........... | A61C 17/028 |
| | | | 433/80 |

(Continued)

FOREIGN PATENT DOCUMENTS

| | | |
|---|---|---|
| CN | 101820832 A | 9/2010 |
| CN | 104274910 A | 1/2015 |

(Continued)

OTHER PUBLICATIONS

StatisticsByJim (Year: 2025); Frost Jim, "Statistics by Jim", https://statisticsbyjim.com/glossary/monotonic-function/—retrieved Sep. 11, 2025 (Year: 2025).*

(Continued)

*Primary Examiner* — Ralph A Lewis

(57) ABSTRACT

An oral irrigator delivers a flow rate as a series of pulses, each pulse having an amplitude which increases progressively over at least the majority of the time duration of the pulse. Each pulse is intended for the cleaning of a single interdental space.

19 Claims, 3 Drawing Sheets

(56)                  References Cited

U.S. PATENT DOCUMENTS

| 2008/0189951 A1 | 8/2008 | Molema et al. | |
|---|---|---|---|
| 2011/0076638 A1 | 3/2011 | Gottenbos et al. | |
| 2014/0127641 A1* | 5/2014 | Hilscher | A61C 17/028 |
| | | | 433/80 |
| 2014/0154640 A1 | 6/2014 | Mok et al. | |

FOREIGN PATENT DOCUMENTS

| CN | 204995600 U | 1/2016 |
|---|---|---|
| DE | 3413277 A1 | 10/1985 |
| JP | H11128252 A | 5/1999 |

OTHER PUBLICATIONS

International Search Report and Written Opinion Dated Mar. 1, 2021 For International Application No. PCT/EP2020/081984 Filed Nov. 13, 2020.

\* cited by examiner

ORAL IRRIGATOR

CROSS-REFERENCE TO RELATED APPLICATIONS

This application is the U.S. National Phase application under 35 U.S.C. § 371 of International Application No. PCT/EP2020/081984, filed on Nov. 13, 2020, which claims the benefit of U.S. Application No. 62/938,636, filed Nov. 21, 2019 and EP Application Serial No. 20154459.0, filed Jan. 30, 2020. These applications are hereby incorporated by reference herein.

FIELD OF THE INVENTION

This invention relates to an oral irrigator.

BACKGROUND OF THE INVENTION

An oral irrigator is a device that uses pressurized water to remove plaque and food debris from between teeth and along the gum line. There are two forms of irrigators; countertop and hand held. A countertop irrigator consists of a base unit with a pump and a reservoir of water that is connected by means of a tube to a handle, a portion of which the user inserts into their mouth to apply the water to the targeted treatment areas.

A hand held irrigator is functionally identical to a countertop irrigator but includes the pump and reservoir all in one hand held device.

Oral irrigators can be an effective treatment for gingivitis, particularly for those who cannot otherwise floss due to limited dexterity or orthodontics. Their effectiveness however is highly dependent on how they are used.

Typically, while using an oral irrigator, there are three user-controllable parameters that directly influence effectiveness; intensity, the speed at which the user traverses from tooth to tooth, and the total treatment time. For best results, it is often recommended to use the highest intensity setting that can be used comfortably while moving from tooth to tooth along the gum line at such a speed that the user can treat their entire mouth in about 90 to 120 seconds. Establishing the right cadence is generally difficult in practice however, particularly for new users, and thus many users tend to hurry through their routine too quickly to achieve best results.

One known solution is to use a timer to alert the user at regular intervals, such as every 30 seconds, which roughly corresponds with the time required to treat each quadrant of the mouth cavity. To alert the user, one approach is to toggle the pump motor off and on electronically a few times quickly.

There are some problems with this timer solution. First, the alert employed is not always obvious to the user and is easily missed. Second, the interval between alerts is too long to provide a meaningful measure of the user's cadence.

This solution forces the user to guess the correct speed for each tooth spacing, which is difficult to do well. If they finish a section too quickly then they are likely to move on to the next section too soon. If the alert occurs before they have completed a section, they will likely just continue on to the beginning of the next section. In either case the result will be untreated or under-treated regions.

It has been considered to provide a real-time closed-loop feedback to the user. However, this results in a technically complex and high cost solution which is difficult to implement with sufficient accuracy.

SUMMARY OF THE INVENTION

The invention is defined by the claims.

According to examples in accordance with an aspect of the invention, there is provided an oral irrigator comprising:
an output nozzle;
a flow system for delivering a pressurized flow of liquid to the output nozzle for ejection from the output nozzle; and
a controller for controlling the flow rate of the pressurized flow ejected from the output nozzle,
wherein the controller is adapted deliver a flow rate which varies over time as a series of pulses, each pulse having an amplitude which increases progressively over at least the majority of the time duration of the pulse.

The pulses in the flow rate delivered by the nozzle are used as feedback information to the user, to assist the user in timing the progression from one interdental space to the next. The pulses increase in flow rate gradually, so that splashing or shock caused by a step increase in flow rate is reduced. The oral irrigator implements an open-loop real-time guidance to reduce user error, without the cost and complexity of a closed-loop feedback system.

Each pulse for example starts with a zero flow rate and ends with a maximum flow rate. In this case, there is a progressive increase in flow rate throughout the duration of the pulse, and it ends with the maximum intended flow rate for the irrigation process.

Each pulse may comprise a ramp having a gradient which decreases monotonically over time. In this way, the flow rate is more constant over time towards the end of the pulse, hence delivering a period of flow at or near the intended maximum flow rate. This prevents a short duration spike in the flow rate at the end of each pulse. The gradient may for example be zero at the end of each pulse (i.e. just before the pulse stops).

Each pulse may end substantially instantaneously, but there may be a sloped end to each pulse. Hence, the increase in flow rate does not need to last for the full duration of the pulse. The change in flow rate at the end of the pulse needs to be immediately discernable to the user so a sharp transition is preferred.

In other examples, each pulse may comprise:
a ramp having a gradient which increases monotonically over time; or
a ramp having a constant gradient.

In other examples, each pulse may comprise a series of incremental step increases in amplitude. This may be considered to provide a discrete implementation of the analog implementations outlined above. This may enable a simpler control implementation.

For example, the slope of the line connecting adjacent steps may have a gradient which decreases monotonically over time. This is then a discrete version of a corresponding analog version described above.

The flow rate may be zero between the pulses. Thus, the user becomes aware that the flow has ceased and this is an indication to progress to the next interdental space.

The flow rate may instead have a non-zero baseline value between the pulses, and the pulses are superposed over the baseline. This may be used to reduce the wear in the flow system or enable a simpler control approach.

The pulses for example have a duration in the range 0.5 to 3 seconds. This is a suitable time to spend irrigating a single interdental space. The duration may be in the range 1 to 2 seconds. The time gaps between pulses may have a duration in the range 0.2 to 2 seconds, for example 0.5 to 1 second. This is a suitable time to transition between interdental spaces without excessively prolonging the overall process.

The oral irrigator may further comprise an audible or visible output device, and wherein the controller is adapted to control the output device to output a signal which indicates per-tooth timing. This provides additional feedback to the user. The output signal is synchronized with the pulses.

The invention also provides a method of providing oral irrigation, comprising:

delivering a pressurized flow of liquid to an output nozzle for ejection from the output nozzle; and controlling the flow rate of the pressurized flow ejected from the output nozzle to deliver a flow rate which varies over time as a series of pulses, each pulse having an amplitude which increases progressively over at least the majority of the time duration of the pulse.

The method may comprise generating each pulse to start with a zero flow rate and end with a maximum flow rate. Each pulse may comprises a ramp having a gradient which decreases monotonically over time.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
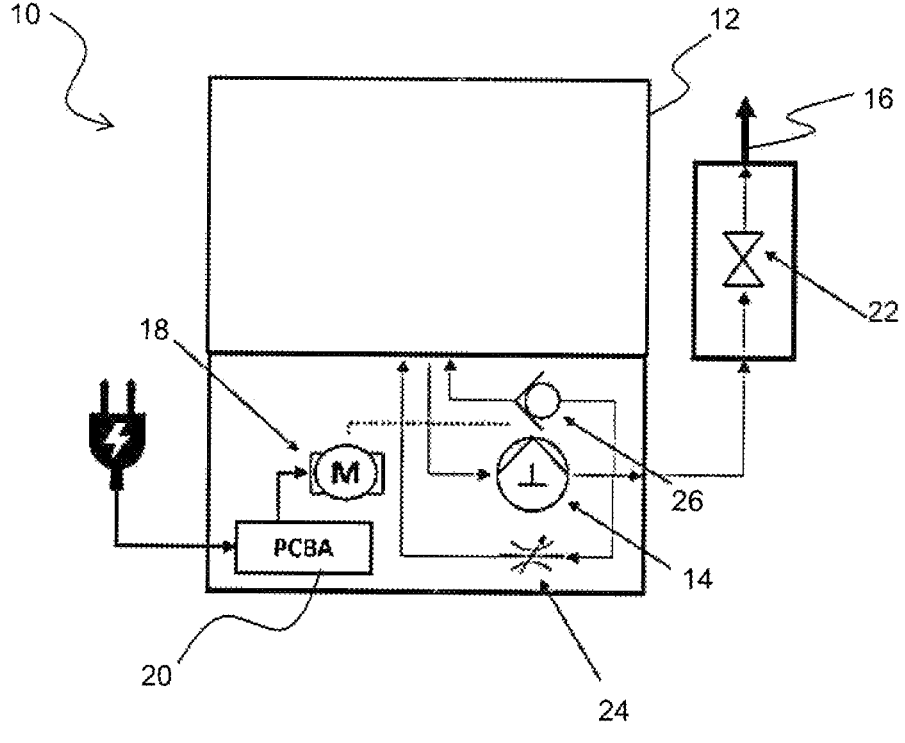
FIG. 1 shows an example of an oral irrigator which may be controlled in accordance with the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an oral irrigator which delivers a flow rate as a series of pulses, each pulse having an amplitude which increases progressively over at least the majority of the time duration of the pulse. Each pulse is intended for the cleaning of a single interdental space.

The invention thus relates to the regulation of the flow rate of pulses of flow output. Before describing the flow regulation of the invention, the general architecture of an oral irrigator will first be outlined.

FIG. 1 shows an example of a typical architecture of a countertop irrigator 10.

The irrigator comprises a water reservoir 12 which delivers water via a pump 14 such as a piston pump to an output nozzle 16. The pump is driven by a pump motor 18, under the control of a control circuit 20. The control circuit controls the motor speed, thereby to control the pressure difference and hence flow rate implemented by the pump.

A shut-off valve 22 is in series with, and upstream of, the output nozzle 16, to enable the user to start and stop the flow. The shut off valve and the output nozzle are parts of the hand held head of the oral irrigator.

The irrigator also includes an intensity control valve 24 for setting the (maximum) flow rate and a pressure relieve valve 26.

The same functionality may instead be implemented by a fully hand held device.

As for the use of a toothbrush, the use of an oral irrigator is highly technique dependent. Proper technique is generally discussed in the product's instructions for use, or is taught by a dental professional. Nonetheless, many users struggle with correct technique, often spending too little time on their routine.

The only known technical solution to this problem is a timer which alerts the user when some predefined period has elapsed.

Figure 2:
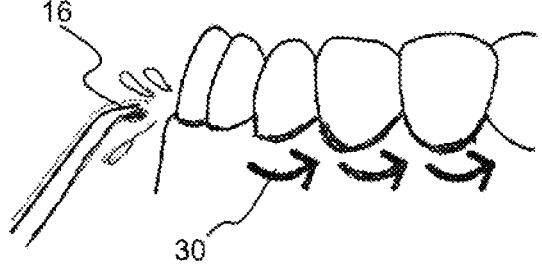
FIG. 2 shows how the nozzle is advance between interdental spaces.

FIG. 2 shows how a user moves the output nozzle 16 from interdental space to interdental space, as shown by arrows 30.

The invention provides a system which delivers a series of pulses of pressurized flow, wherein each pulse corresponds to an interdental space. However, instead of providing each pulse as a square wave pulse, the flow rate during each individual pulse has an amplitude which increases progressively over at least the majority of the time duration of the pulse.

Figures 3, 4, 5, 6:
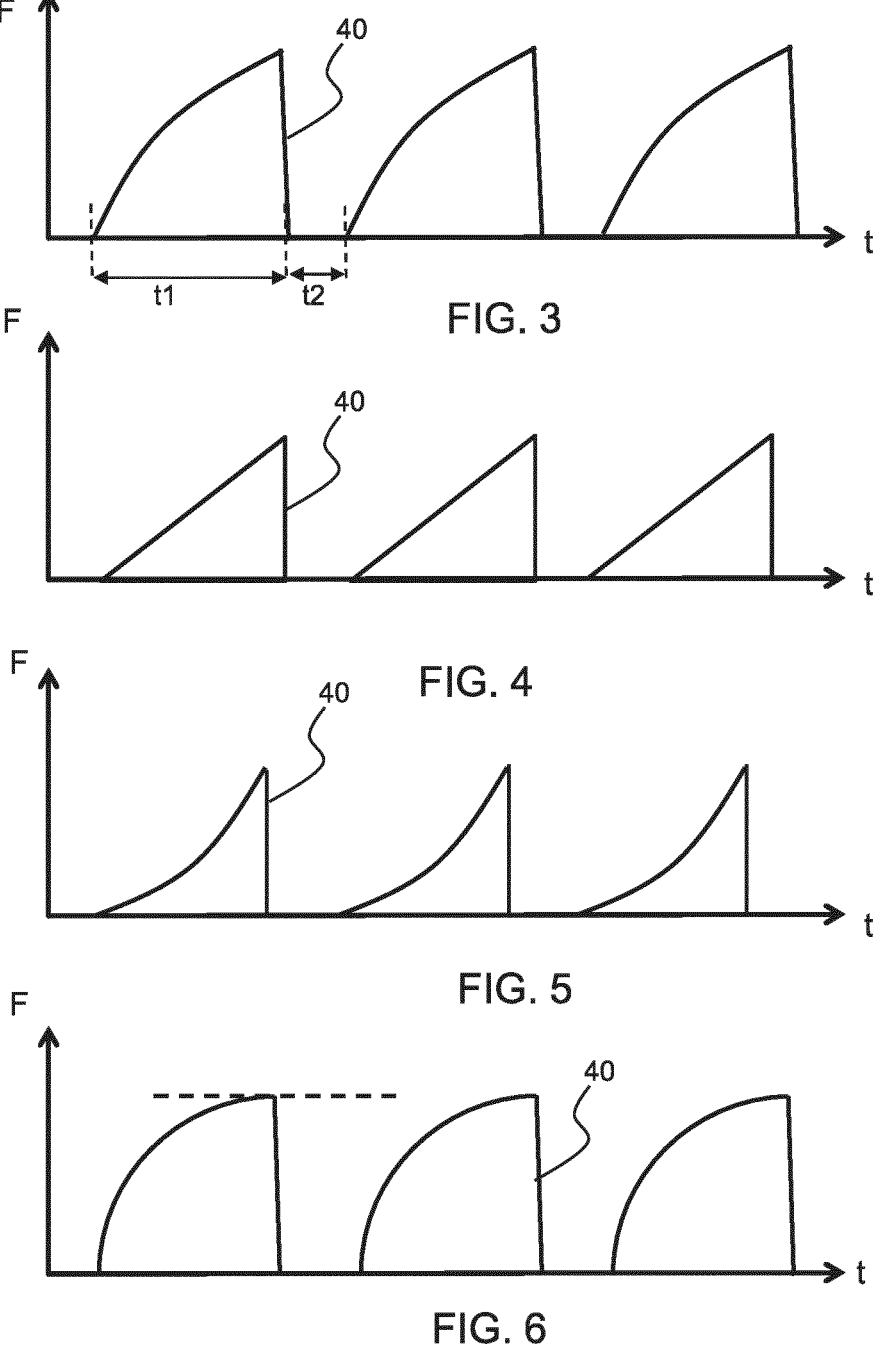
FIGS. 3 to 11 shows examples of possible flow rate pulses for the delivered flow.

FIG. 3 shows a first example of a series of pulses 40, plotted as flow rate F versus time. The flow rate is adjusted by controlling the motor and hence the pump. Thus, the y-axis may instead represent the motor drive signal (e.g. voltage).

The pulses for example each have a duration t1 in the range 0.5 to 3 seconds. This is a suitable time to spend irrigating a single interdental space. The duration may be in the range 1 to 2 seconds such as 1.5 second.

The time gaps t2 between pulses may have a duration in the range 0.2 to 2 seconds, for example 0.5 to 1 second. This is a suitable time to transition between interdental spaces without excessively prolonging the overall process.

With 30 interdental spaces in total (for an adult set of teeth), and treating both sides of each space (so 60 pulses), this corresponds to a treatment time in the range 42 seconds (0.5 seconds per space and 0.2 second gap; 1.4 Hz) to 300 seconds (3 second per space and 2 second gap; 0.2 Hz). More preferably, the total treatment time that results is in the range 60 seconds (1 Hz) to 120 seconds (0.5 Hz) such as around 80 seconds (0.75 Hz) or 90 seconds (0.67 Hz) or between the two. For example, 80 seconds corresponds to 1.33 seconds per interdental space, such as a 1 second pulse and a 0.33 second gap.

These timings apply to all of the example of flow rate profile discussed below. The pulses in the flow rate delivered by the nozzle are perceived by the user, and they are used as feedback information, to assist the user in timing the progression from one interdental space to the next The pulses increase in flow rate gradually, so that splashing or shock caused by a step increase in flow rate is reduced.

Each pulse in the example of FIG. 3 starts with a zero flow rate and ends with a maximum flow rate. In this case, there is a progressive increase in flow rate throughout the duration of the pulse, and it ends with the maximum intended flow rate for the irrigation process. This assumes the end of the flow rate pulse is instant. In practice will be a finite time over which the flow rate drops to zero, as the pump motor slows to a halt. However, for examples where an instant halt to the flow is intended, this end ramp is not considered to be part of the pulse, and the pulse may be considered to end as soon as an instruction is given to the motor to cease flow. Thus, the pulse ends at the maximum intended flow rate.

As is clear from examples below, the pulse may instead deliberately have a period of flow rate reduction at the end of the pulse. Even if there is a sloped end to each pulse, the change in flow rate is still be discernable to the user so a sharp transition is preferred.

In FIG. 3, each pulse comprises a ramp having a gradient which decreases monotonically over time. Thus, the pulse starts with a relatively steep gradient so that the flow rate builds quickly, and ends with a flatter gradient so that a more constant flow rate is delivered. This gives a period of flow at or near the intended maximum flow rate for part of (i.e. the end of) the duration of the pulse.

FIGS. 4 to 11 show alternative pulse shapes, again as flow rate (or motor drive voltage) versus time.

FIG. 4 shows a first alternative in which the pulse comprises a linear ramp.

In FIG. 5, each pulse comprises a ramp having a gradient which increases monotonically over time. Thus, the pulse starts with a relatively flat gradient so that the flow rate builds gradually.

FIGS. 4 and 5 are less preferred than FIG. 3 in that a short duration spike appears in the flow rate at the end of each pulse. Thus, there is no sustained delivery of flow at or close to the desired optimal flow rate. However, the end of each pulse may be more noticeable.

FIG. 6 shows a modification to FIG. 3 in which the gradient is zero at the end of each pulse (i.e. just before the pulse stops). This means there is a period of sustained flow rate at the desired maximum flow rate for optimal treatment results.

FIGS. 3 to 6 all shows pulses which start and end with a zero flow, i.e. the pump motor turned off.

Figures 7, 8, 9, 10, 11:
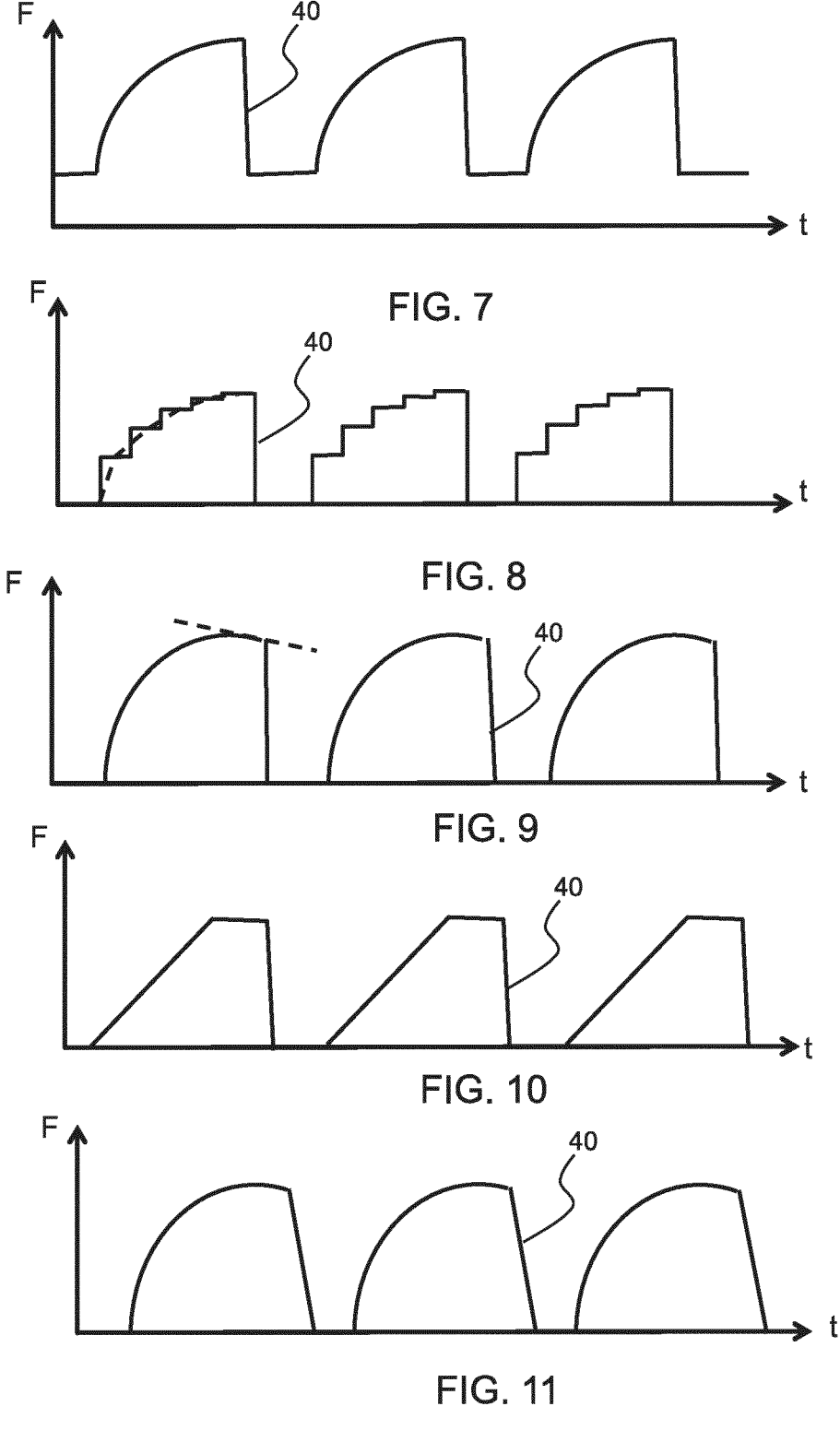

FIG. 7 shows a modification to FIG. 6 in which each pulse is superposed over a baseline. This may be used to reduce the wear in the flow system or enable a simpler control approach. The flow reduction to the baseline value is sufficient to make the flow rate change easily perceivable by the user.

FIGS. 3 to 7 all shows pulses which have a smooth i.e. analog shape.

FIG. 8 shows a modification to FIG. 6 in which each pulse comprises a series of incremental step increases in flow rate amplitude. This may be considered to provide a discrete implementation of the analog implementation of FIG. 6. This may enable a simpler control implementation for the motor.

Discrete versions of all of the analog pulse shapes may be implemented. The shape of each pulse may then be characterized by its analog equivalent. For example, for FIG. 8, the slope of the line connecting the center points of adjacent steps has a gradient which decreases monotonically over time. This is thus a discrete version of FIG. 6.

FIGS. 3 to 8 all shows pulses which end at the maximum flow rate, ignoring the intended instant return to zero or to the baseline.

FIG. 9 shows an example where the pulse peaks before the end, and thus has a negative gradient at the end of the pulse, even before the return to zero or to the baseline.

Thus, the pulse flow rate does not need to increase progressively over all of the duration of the pulse. Instead, it may increase over at least the majority of the time duration of the pulse. In other words, the pulse is at the maximum flow rate for less than half of the duration of the pulse.

As another example of this option, FIG. 10 shows an example with an initial linear ramp followed by a period at the maximum flow rate. The period of increase may for example last for the first half of the pulse, after which the maximum has been reached.

FIGS. 3 to 10 all shows pulses which have an intended instant return to zero or to the baseline at the end of the pulse.

FIG. 11 shows an example in which there is a deliberate ramp down to zero (or to the baseline) which may be considered to be part of the pulse.

In all examples shown, all pulses have the same peak flow rate. However, this may change over time, for example based on input from the user. Thus, the user may set the maximum flow rate.

The use may interrupt the sequence of pulses using the shut-off valve 22, and then start the sequence again when ready.

The oral irrigator may further comprise an audible or visible output device, and wherein the controller is adapted to control the output device to output a signal which indicates per-tooth timing. This provides additional feedback to the user. The output signal is then synchronized with the pulses.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. An oral irrigator comprising:
an output nozzle;
a flow system for delivering a pressurized flow of liquid to the output nozzle for ejection from the output nozzle; and
a controller for controlling a flow rate of the pressurized flow ejected from the output nozzle, the controller being adapted to deliver a flow rate which varies over time as a series of pulses, each pulse having a flow rate amplitude which increases progressively over at least a majority of a time duration of the pulse, and a time gap, being provided between the pulses, wherein: each pulse is for oral irrigation of a single respective interdental space; and each pulse comprises a series of incremental step increases in flow rate amplitude.

2. The oral irrigator as claimed in claim 1, wherein each pulse starts with a zero flow rate and ends with a maximum flow rate.

3. The oral irrigator as claimed in claim 1, wherein each pulse comprises a flow rate ramp having a gradient which decreases monotonically over time.

4. The oral irrigator as claimed in claim 3, wherein the gradient is zero at an end of each pulse.

5. The oral irrigator as claimed in claim 1, wherein each pulse includes at least one of a flow rate ramp having a gradient which increases monotonically over time, and a flow rate ramp having a constant gradient.

6. The oral irrigator as claimed in claim 1, wherein a slope of a line connecting adjacent steps has a gradient which decreases monotonically over time.

7. The oral irrigator as claimed in claim 1, wherein the flow rate is zero between the pulses.

8. The oral irrigator as claimed in claim 1, wherein the flow rate has a non-zero baseline value between the pulses, and the pulses are superposed over the baseline.

9. The oral irrigator as claimed in claim 1, wherein each pulse has a duration in a range of 0.5 seconds to 3 seconds.

10. The oral irrigator as claimed in claim 1, wherein the time gaps between pulses have a duration in a range of 0.2 seconds to 2 seconds.

11. The oral irrigator as claimed in claim 1, further comprising an output device, wherein the controller is adapted to control the output device to output a signal which indicates per-tooth timing.

12. An oral irrigator as claimed in claim 1, wherein each pulse has a duration in a range 1 to 2 seconds.

13. An oral irrigator as claimed in claim 1, wherein each pulse has a duration in a range 0.5 to 1 second.

14. A method of providing oral irrigation, the method comprising:

delivering a pressurized flow of liquid to an output nozzle for ejection from the output nozzle; and waiting for a time gap to move from interdental space to interdental space; and controlling a flow rate of the pressurized flow ejected from the output nozzle to deliver a flow rate which varies over time as a series of pulses, each pulse having an amplitude which increases progressively over at least a majority of a time duration of the pulse and a time gap being provided between the pulses, wherein: each pulse is for oral irrigation of a single respective interdental space; and each pulse comprises a series of incremental step increases in flow rate amplitude.

15. The method as claimed in claim 14, further comprising generating a pulse to start with a zero flow rate and end with a maximum flow rate.

16. The method as claimed in claim 14, wherein each pulse includes a ramp having a gradient which decreases monotonically over time.

17. The method as claimed in claim 16, wherein the gradient is zero at an end of each pulse.

18. The method of claim 14, wherein each pulse starts with a zero flow rate and ends with a maximum flow rate.

19. The method as claimed in claim 14, wherein each pulse includes at least one of a flow rate ramp having a gradient which increases monotonically over time, and a flow rate ramp having a constant gradient.

\* \* \* \* \*